(12) United States Patent
Kang et al.

(10) Patent No.: US 6,393,575 B1
(45) Date of Patent: May 21, 2002

(54) SEMICONDUCTOR DEVICE HAVING INPUT BUFFERS

(75) Inventors: Tae-Gyoung Kang; Hee-Choul Park, both of Kyunggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/216,681

(22) Filed: Dec. 18, 1998

(30) Foreign Application Priority Data

Dec. 29, 1997 (KR) .......................................... 1997-77272

(51) Int. Cl.[7] ................................................. G06F 1/04
(52) U.S. Cl. ........................................... 713/400; 716/6
(58) Field of Search ................................. 713/400, 503, 713/600; 716/6, 8

(56) References Cited

U.S. PATENT DOCUMENTS

| | | | | |
|---|---|---|---|---|
| 5,615,358 A | * | 3/1997 | Vogley | 713/501 |
| 5,774,371 A | * | 6/1998 | Kawakami | 364/491 |
| 5,784,600 A | * | 7/1998 | Doreswamy et al. | 713/503 |
| 5,946,477 A | * | 8/1999 | Ito | 395/500.1 |
| 5,978,419 A | * | 11/1999 | Cassiday et al. | 375/257 |

* cited by examiner

*Primary Examiner*—Dennis M. Butler
(74) *Attorney, Agent, or Firm*—Myers Bigel Sibley & Sajovec

(57) ABSTRACT

A semiconductor device comprises a plurality of input/output pads, and a plurality of input buffers for receiving external signals synchronized with a clock signal through corresponding ones of the input/output pads, wherein the input buffers are arranged adjacent to each other to minimize skewing of the clock signal to the input buffers.

4 Claims, 3 Drawing Sheets

SEMICONDUCTOR DEVICE HAVING INPUT BUFFERS

FIELD OF THE INVENTION

The present invention concerns a semiconductor device with data input buffers, and more particularly means for reducing skew of a clock signal to the data input buffers.

BACKGROUND OF THE INVENTION

As the semiconductor memory device is developed to carry out synchronous operation at higher speed, the setup/hold time has become more important factors to properly control the device. However, the conventional circuit technology does not satisfactorily meet the requirements for the setup/hold time and control. FIG. 1 illustrates a conventional semiconductor device, which includes five input/output pads 10, 12, 14, 16 and 18, corresponding data output buffers 20, 22, 24, 26 and 28, and corresponding data input buffers 30,32,34,36 and 38. As shown in FIG. 1, the input and output buffers 20 to 28 and 30 to 38 are arranged with the same intervals as the data input/output pads 10 to 18. In this case, the skewing of the clock/control signals CLK/CTL to the data input buffers increase proportionately along the length of the transfer lines 40 and 42 going from the first data input buffer 30 corresponding to the first input/output pad 10 to the last data input buffer 38 corresponding to the fifth input/output pad 18 along the transfer lines 40 and 42, so that the margin of the setup/hold time is reduced to make it hard to control the buffers.

SUMMARY OF THE INVENTION

It is an object of the present invention to provide a semiconductor device with means to improve margin of the setup/hold time.

According to an embodiment of the present invention, a semiconductor device comprises a plurality of input/output pads, and a plurality of input buffers for receiving external signals synchronized with a clock signal through corresponding ones of the input/output pads, wherein the input buffers are arranged adjacent to each other to minimize skewing of the clock signal to the input buffers.

The present invention will now described more specifically with reference to the drawings attached only by way of examples.

BRIEF DESCRIPTION OF THE ATTACHED DRAWINGS

DESCRIPTION OF THE PREFERRED EMBODIMENTS

Figure 1:
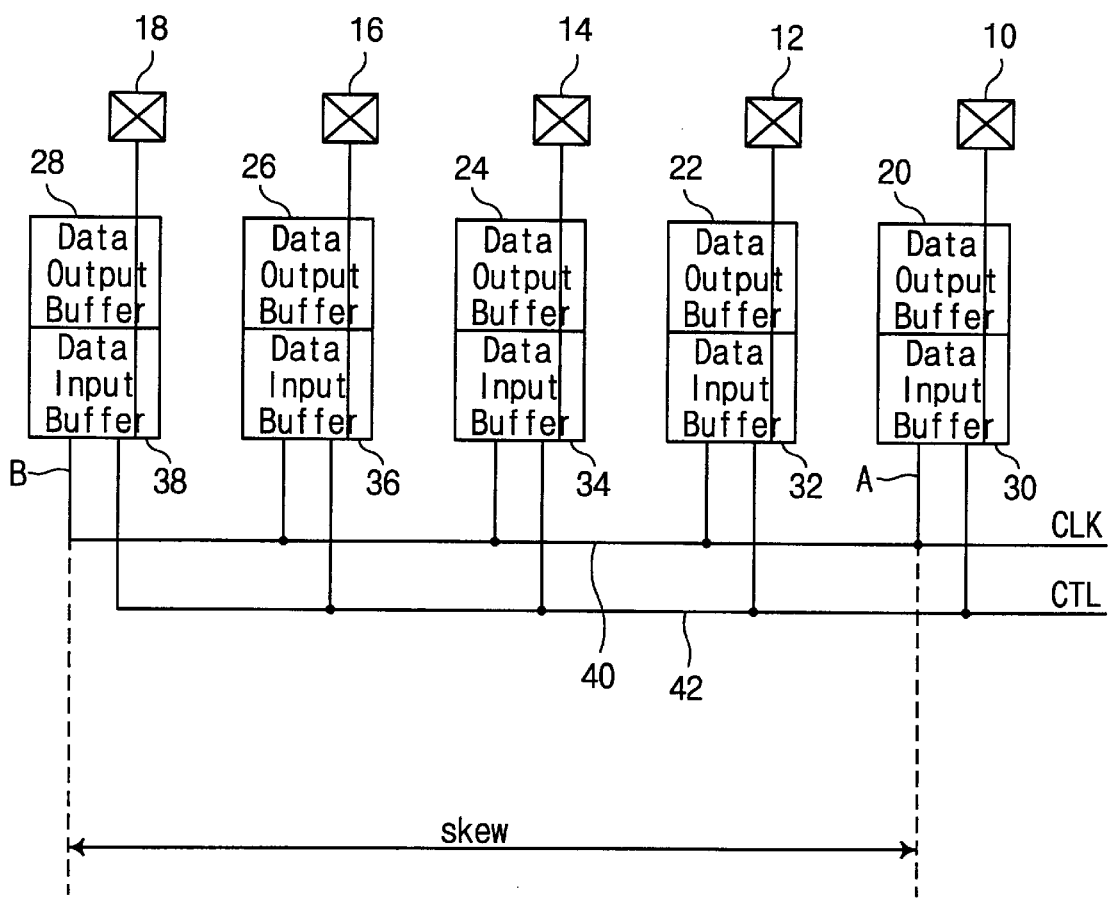
FIG. 1 is a layout of the data input/output buffers of a conventional semiconductor device.
Figure 2:
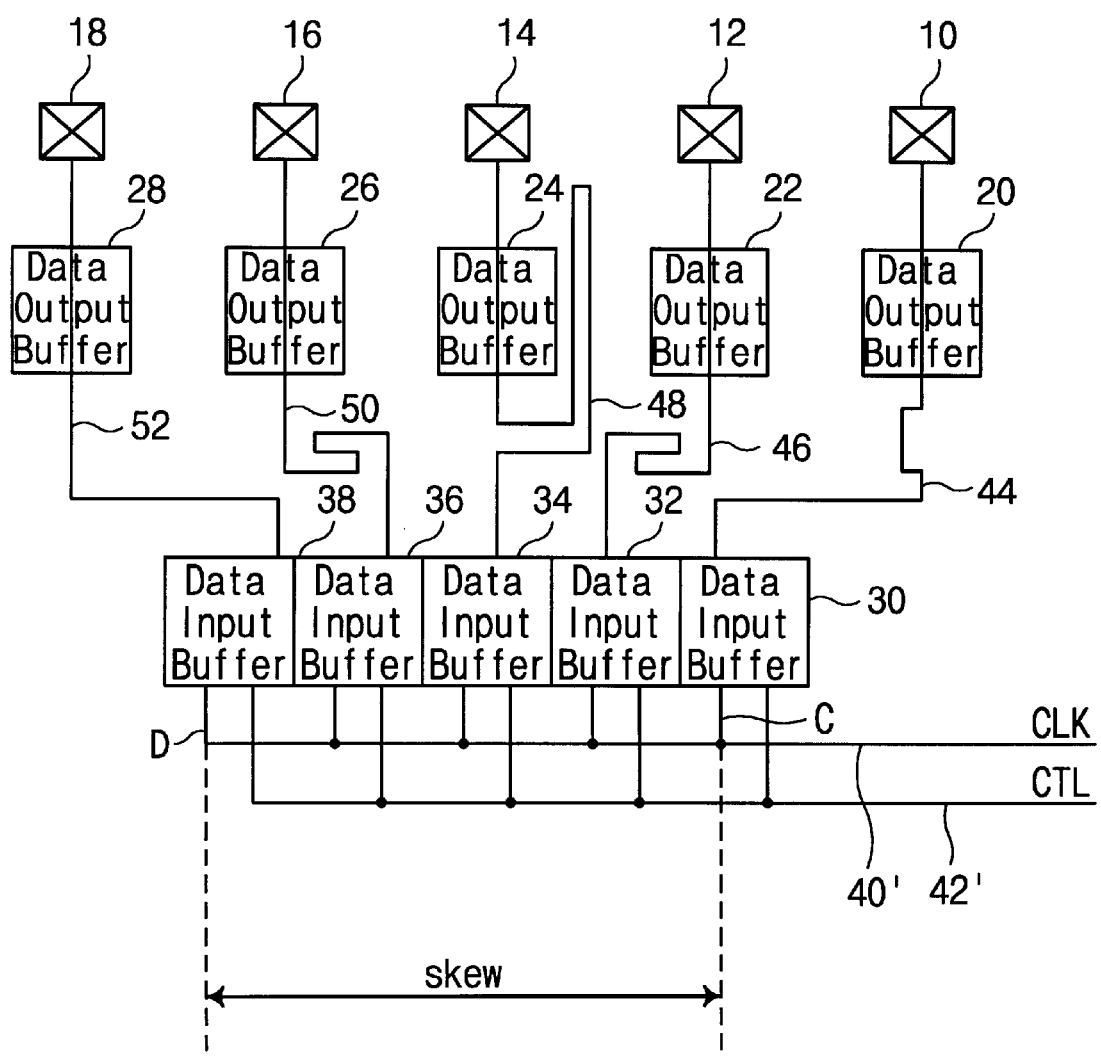
FIG. 2 is a layout of the data input buffers of a semiconductor device arranged adjacent to each other according to the present invention.

Referring to FIG. 2, although the data output buffers 20 to 28 are arranged with the same intervals as the corresponding input/output pads 10 to 18 of the conventional layout as shown in FIG. 1, the data input buffers 30 to 38 are adjacently arranged regardless of the intervals between the input/output pads 10 to 18 so as to minimize skewing of the control and clock signals CLK and CTL to the input buffers 30 to 38. Namely, the transfer lines 40' and 42' of the clock/control signals CLK/CTL are reduced compared to the transfer lines 40 and 42 of the conventional layout as shown in FIG. 1 .This improves the margin of the setup/hold time of the input data, facilitating the control of the input buffers 30 to 38.

In addition, a plurality of transfer lines 44, 46, 48, 50 and 52 to electrically connect the data input buffers 30 to 38 with the corresponding input/output pads 10 to 18 are designed to have same lengths so as to make the delay times of the external data supplied through the input/output pads 10 to 18 have same lengths. This serves also to eliminate the skewing of the externally applied data.

Figure 3:
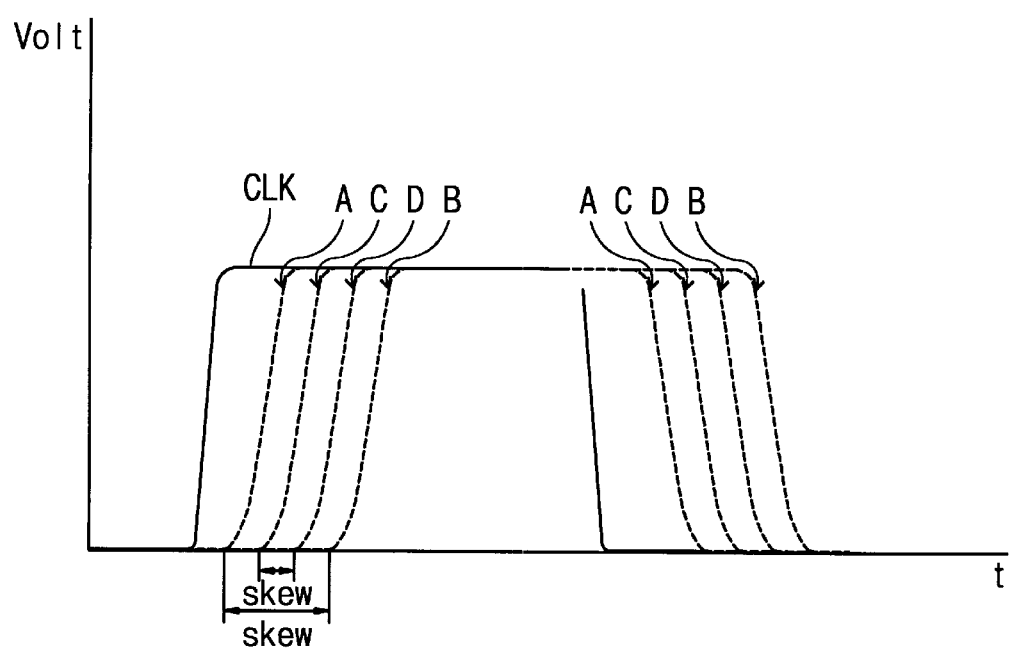
FIG. 3 is a graph for illustrating skewing of the control signal to compare the performance of the inventive layout with that of the conventional layout.

Thus, as shown in FIG. 3, the skewing of the clock signal CLK is considerably reduced in the inventive layout of the data input buffers than in the conventional layout. The adjacent arrangement of the data input buffers accordingly reduces the lengths of the transfer lines 40' and 42'. This improves the margin of the setup/hold time for the input buffers 30 to 38 by the reduction of the delay time of the transfer lines, thus facilitating the control of the data input buffers.

While the invention has been described in reference to the specific embodiment accompanied by the drawings, it will be readily appreciated by those skilled in this art that various changes and modifications may be made without departing the gist of the present invention.

What is claimed is:

1. A semiconductor device comprising:

a plurality of input/output pads; and a plurality of input buffers for receiving external signals synchronized with a clock signal through corresponding ones of said input/output pads, wherein adjacent ones of said input buffers are in contact with each other to minimize a spacing therebetween to minimize skewing of said clock signal to said input buffers.

2. A semiconductor device as defined in claim 1, further including corresponding output buffers arranged with the same intervals as said input/output pads.

3. A semiconductor d device as defined in claim 1, wherein a plurality of transfer lines respectively make electrical connections between said plurality of input buffers and corresponding ones of said input/output pads, and said transfer lines are designed to have same lengths so as to make the delay times of the external data supplied through said input/output pads have same lengths.

4. A semiconductor device comprising:

a plurality of input/output pads spaced-apart from one another;

a plurality of output buffers corresponding to the plurality of input/output pads, wherein the plurality of output buffers are spaced-apart by an amount equal to the spacing of the plurality of input/output pads;

a plurality of input buffers for receiving external signals synchronized with a clock signal through corresponding ones of said input/output pads, wherein adjacent ones of said input buffers are in contact with each other to minimize a spacing therebetween to minimize skewing of said clock signal to said input buffers; and a plurality of transfer lines that respectively make electrical connections between said plurality of input buffers and corresponding ones of said input/output pads, said transfer lines having about equal lengths so as to equalize the delay times of external data supplied to the plurality of input buffers through said input/output pads.

* * * * *